March 28, 1933.   W. B. DAMSEL   1,903,029
PIPE COUPLING
Filed May 7, 1930   3 Sheets-Sheet 1

Inventor
W. B. Damsel
By Seymour & Bright
Attorneys

March 28, 1933. W. B. DAMSEL 1,903,029
PIPE COUPLING
Filed May 7, 1930 3 Sheets-Sheet 2
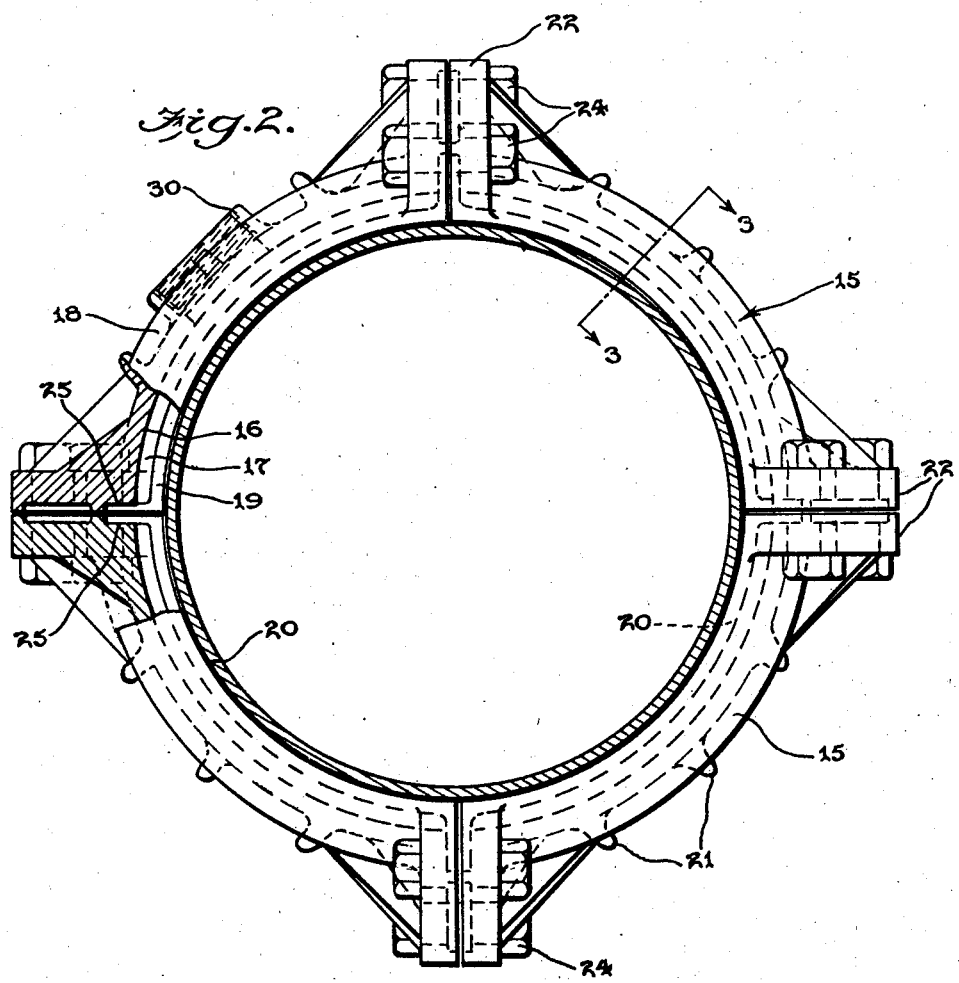
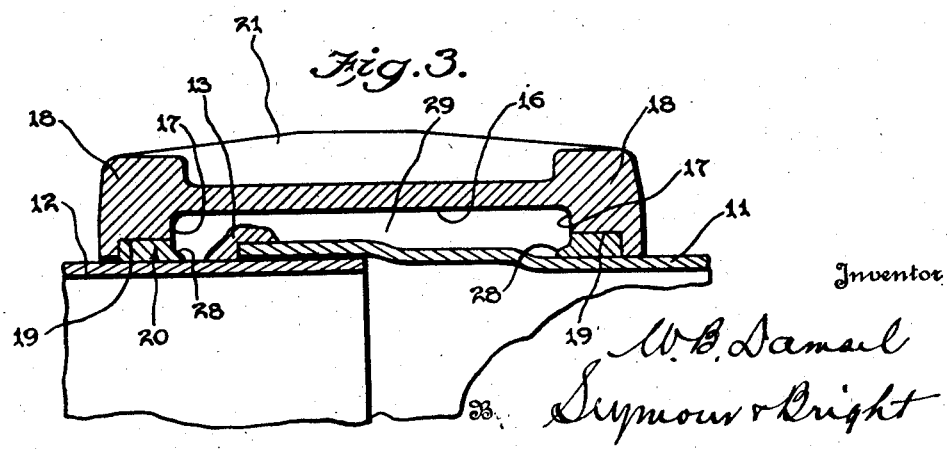
Inventor
W. B. Damsel
Seymour & Bright
Attorneys

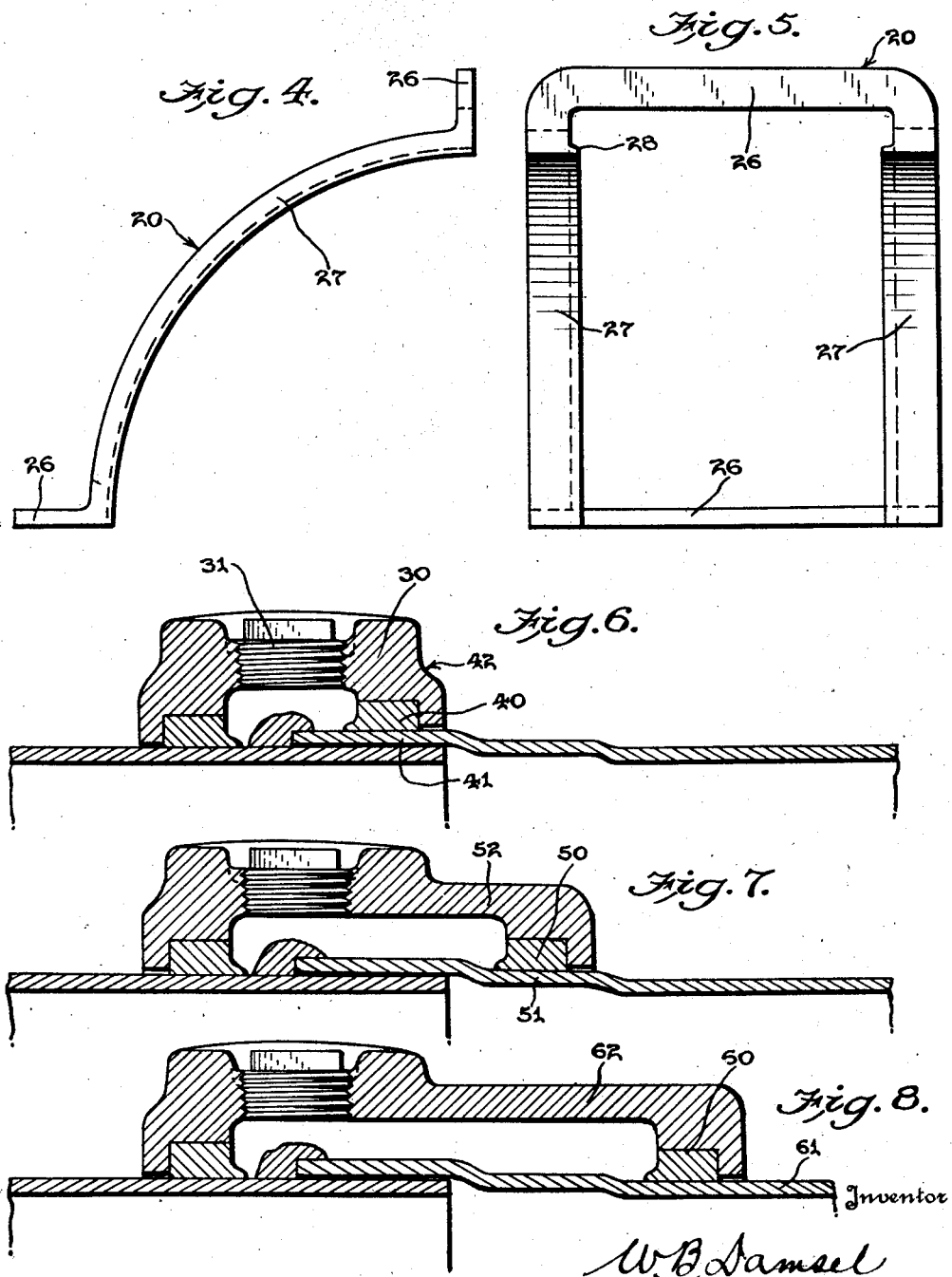

Patented Mar. 28, 1933

1,903,029

UNITED STATES PATENT OFFICE

WILLIAM B. DAMSEL, OF NEW YORK, N. Y., ASSIGNOR TO VICTAULIC COMPANY OF AMERICA, OF NEW YORK, N. Y., A CORPORATION OF NEW JERSEY

PIPE COUPLING

Application filed May 7, 1930. Serial No. 450,53b.

This invention relates to improvements in pipe couplings, and more particularly to leak stoppers for pipe lines.

One of the salient objects of the invention is to provide a repair coupling which may be placed on a pipe line at a point where a leak occurs, either in the pipe lengths, or at the joints. For instance, pipe lines having welded couplings are sometimes ruptured at a joint, and in such a case, my novel repair ring can be readily placed on the line at the point where the leak is located, and it will effectively stop the leakage.

Another object is to furnish a repair ring of this character provided with novel packing means having lips which are pressed against the exterior of the pipe line by the pressure of the fluid flowing through the line.

Another object is to provide a sectional repair coupling, each section of which is combined with an endless packing member, these members being clamped against one another when the sections of the ring are secured to the pipe line.

A still further object is to furnish a structure of this type, so designed that one side of a packing member may be arranged closer to the axis of the pipe line than the other side of said member, in case it is necessary to apply the repair ring to portions of a pipe line of varying diameters.

A further object is to furnish a repair ring having means to allow for the escape of the pipe line fluid while the ring is being applied to the pipe line, such means to be closed by a stopper or plug after the ring has been installed so as to cut off the escape of the fluid.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 2 is an end view of the ring, partly in transverse vertical section.

Fig. 3 is a radial sectional view of the ring on the line 3—3 of Fig. 2.

Fig. 4 is a side elevation of one of the packing elements.

Fig. 5 is a front elevation of the same.

Figs. 6, 7 and 8 are longitudinal sectional views respectively, of rings and packing elements designed for use with portions of pipe lines having different diameters.

Figure 1:
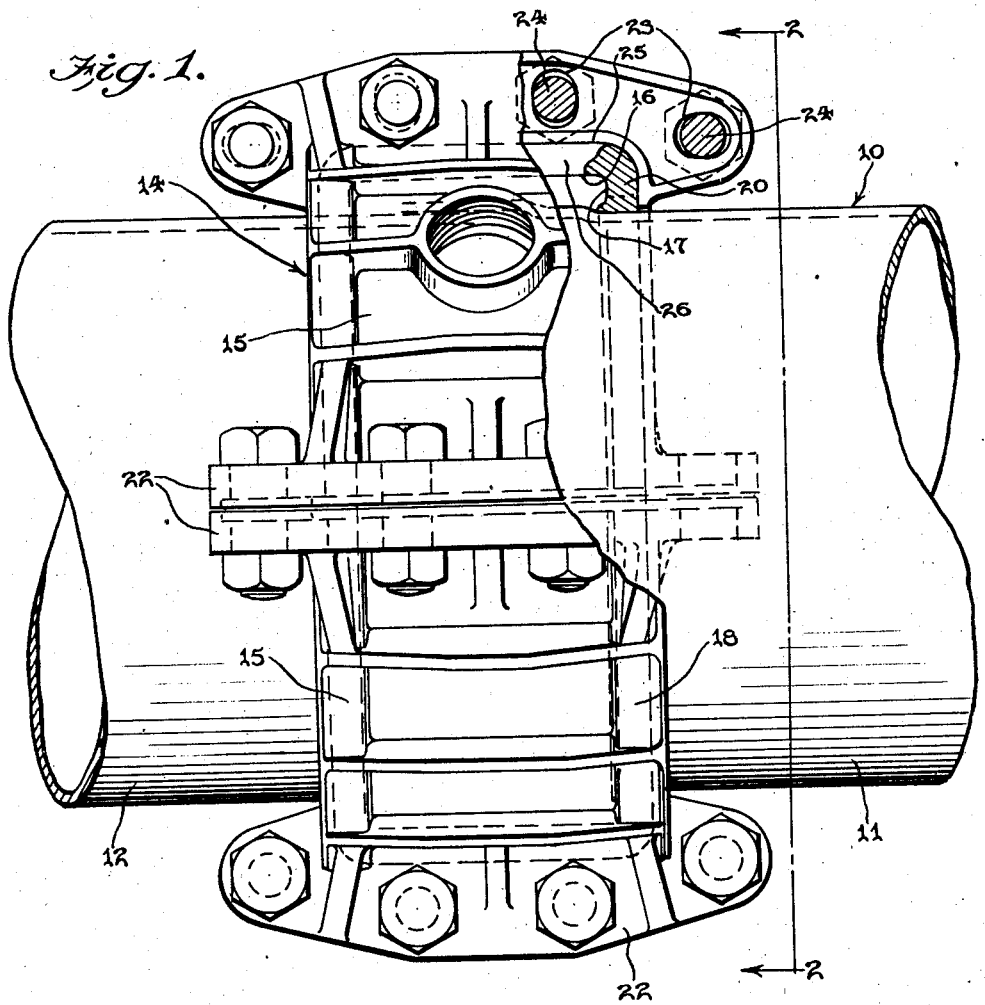
Fig. 1 is a side elevation of a joint portion of a pipe line, provided with one of my improved repair rings, the latter being shown in elevation, but partly cut away to show a section.

In the drawings, 10 designates a pipe line of the type employed to contain fluid under pressure. For the purpose of this disclosure, we will assume that the pipe line is made up of pipe lengths having their ends joined together by welded joints. For instance, as shown in Fig. 3, the end of one pipe 11 is enlarged to receive the end of an adjacent pipe 12, and these pipes are joined by welding, as indicated at 13. In case a leak should occur in a joint of such a pipe line, I take care of the same by means of my improved repair ring, which is indicated in its entirety at 14. This ring is made up of any suitable number of segmental sections 15, and each of these sections may be a rugged metal casting, having a parti-cylindrical inner surface 16 which merges into transversely disposed side surfaces 17.

The portions of the section on which the surfaces 17 are located, are provided with segmental walls 18, the inner edges 19 of which are rabbeted to receive a packing member 20, hereinafter described.

The walls 18 project outwardly as well as inwardly, and their outer portions are joined by reinforcing ribs 21 which extend in the direction of the axis of the ring.

The ends of each section have an outwardly extending radially disposed flange 22, into which the walls 18 merge, and each of these flanges is provided with a series of slots 23 to receive the bolts 24 employed in securing the sections together.

Each flange is rabbeted lengthwise thereof, as shown at 25, to receive one of the axially extending or connecting portions 26 of one of the packing members. Such a packing member is best shown in Figs. 4 and 5, and it may be made of flexible rubber or the like, and it consists of two parti-circular side portions 27, and two axially extending portions 26, these portions forming an endless member; the sides 27 of which rest in the rabbets 19 of a ring section, and the axial portions 26 resting in the rabbets 25 when the parts are assembled. Each of the side portions of the packing member has an inwardly extending lip 28 which is designed to rest on the exterior of the pipe line, and to be pressed toward the latter by the pressure existing in the annular chamber 29 of the ring, when the latter is applied to the pipe line.

It will be noted that the portions 26 of each packing member are arranged at angles to one another. If four sections are to be used for the repair ring, the portions 26 of the packing member will be arranged at 90 degrees, as shown in Fig. 4, and consequently, when the sections of the ring are assembled with the packing members therein, the portions 26 of the adjacent packing members will abut against one another, and form tight seals when the bolts 24 are screwed up tight.

It will be understood that a repair ring of this type may be attached to the pipe line without breaking any of the joints of the latter, and in case a pressure fluid should be escaping from the line while the ring is being installed, such fluid would enter the chamber 29. To allow for the escape of this fluid from the chamber, so that it will not interfere with the installing of the ring, one of the sections is provided with a circular boss 30 having an opening therein communicating with the atmosphere, and after the ring parts have been assembled on the pipe line, a screw threaded plug 31 is attached to the boss for the purpose of closing the hole, and thus sealing the ring. From that time on, any pressure fluid in the chamber 29, will act on the lips 28 to force the latter into close contact with the external surface of the pipe line.

In view of the fact that it may be desirable to extend the repair ring for different lengths along the length of the pipe line, this may be accomplished with my improved design, as illustrated in Figs. 6, 7 and 8. For instance, in Fig. 6, one side 40 of the packing member may engage the portion 41 of the pipe which is of maximum diameter, and in such case, the sections 42 of the ring will be of relatively short length.

In Fig. 7, one side 50 of a packing annulus is shown engaging a portion 51 of a pipe end, which is of intermediate diameter, and in this case, the ring sections 52 are made somewhat longer, while in Fig. 8, the side 60 of the packing ring engages a portion 61 of the pipe line which is of minimum diameter, and in this case, the ring sections 52 are made relatively long. From this it will be understood that while following the same principle of mechanical construction, the portions of the ring may be varied to take care of welded joints of various types.

In a repair ring involving this principle, the packing members provide a plurality of spaced continuous lips which entirely surround the pipe line. Furthermore, there is a gasket contact at each end of each section, and this contact may be tightly maintained by means of the bolts 24. Moreover, inner compression causes a gasket to metal contact to take place along a plurality of lines encircling the pipe line.

While I have disclosed what I now consider to be preferred embodiments of the invention in such manner that the same may be readily understood by those skilled in the art, I am aware that changes may be made in the details disclosed, without departing from the spirit of the invention, as expressed in the claims.

What I claim and desire to secure by Letters Patent is:

1. A repair ring for pipe lines or the like, comprising a sectional sleeve encircling the pipe line, and endless gaskets bearing against the exterior of the pipe line and secured in position by said sections, each gasket having parti-circular side portions and portions connecting the side portions and extending axially of the ring.

2. A repair ring for pipe lines or the like, comprising a sectional sleeve encircling the pipe line, and endless gaskets bearing against the exterior of the pipe line and secured in position by said sections, each gasket having parti-circular side portions and portions connecting the side portions and extending axially of the ring, the connecting portions of each gasket being arranged at angles to one another.

3. A repair ring for pipe lines or the like, comprising a sectional sleeve encircling the pipe line, and endless gaskets bearing against the exterior of the pipe line and secured in position by said sections, each gasket having parti-circular side portions and portions connecting the side portions and extending axially of the ring, a connecting portion of each gasket abutting against a connecting portion of an adjacent gasket.

4. A repair ring including a segmental metallic section having outwardly extending flanges at its ends, said section having an endless rabbet extending along its inner edge, and an endless packing gasket extending along said rabbet and having portions arranged parallel to said flanges.

In testimony whereof, I have signed this specification.

WILLIAM B. DAMSEL.